Oct. 11, 1955     C. C. DROEGER     2,720,276
SOUND DEADENING MEANS FOR JET ENGINE TEST STANDS
Filed Dec. 19, 1951     2 Sheets-Sheet 1
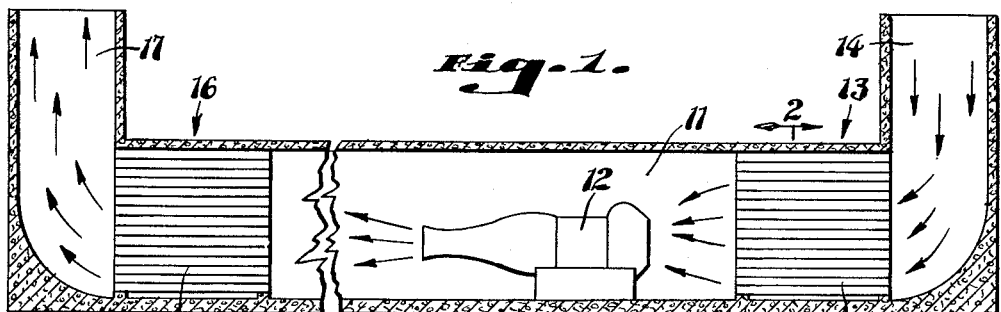
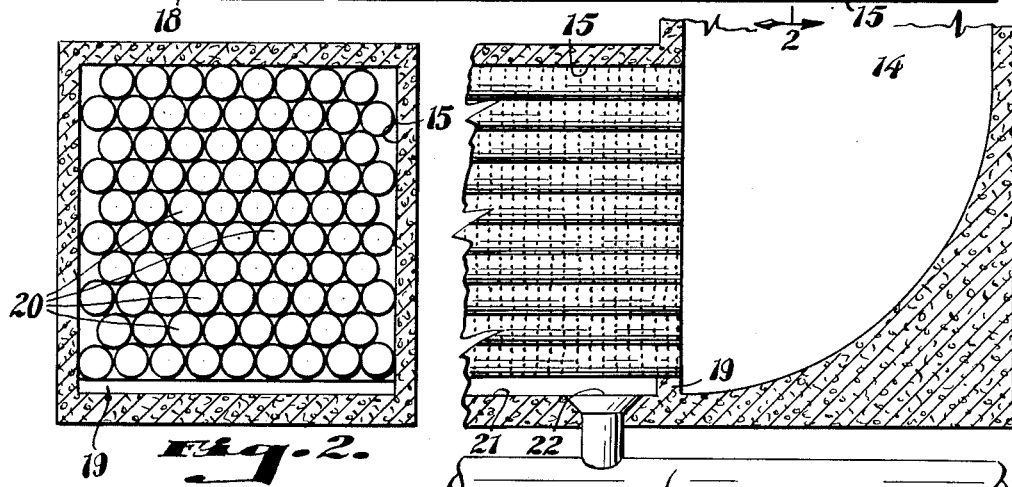
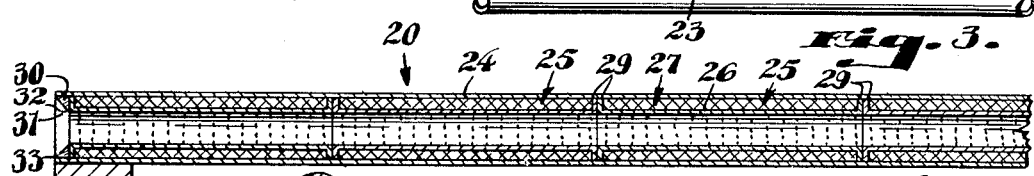
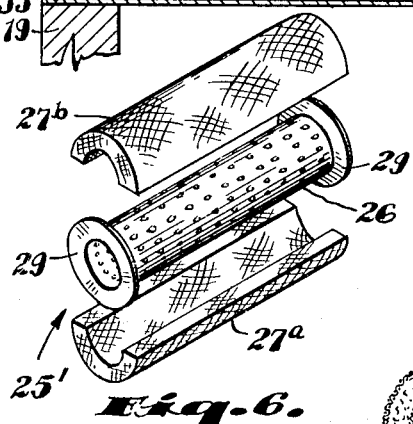
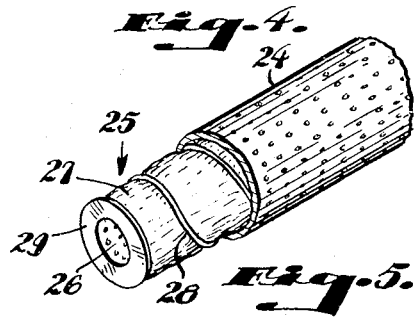
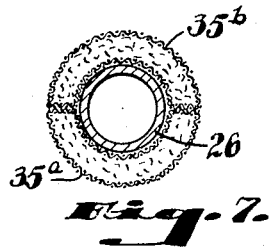
INVENTOR.
CARL C. DROEGER,
BY: Harold B. Hood
ATTORNEY.

Oct. 11, 1955     C. C. DROEGER     2,720,276
SOUND DEADENING MEANS FOR JET ENGINE TEST STANDS
Filed Dec. 19, 1951     2 Sheets-Sheet 2

INVENTOR.
CARL C. DROEGER,
BY
Harold B. Hood
ATTORNEY.

United States Patent Office 2,720,276
Patented Oct. 11, 1955

2,720,276

SOUND DEADENING MEANS FOR JET ENGINE TEST STANDS

Carl C. Droeger, Greenfield, Ind.

Application December 19, 1951, Serial No. 262,449

11 Claims. (Cl. 181—46)

It has long been commercially customary to test aircraft engines and the like in test stands such, for instance, as those disclosed in the patent to Parkinson et al., 2,270,825, or in the patent to Tucker, 2,519,161. The air streams induced by the propellers of the engines illustrated in those patents are caused to flow through multiple conduits defined, in induction and eduction passages merging with the chambers in which the engines are mounted, by partitions formed of porous, self-sustaining sound-absorbent material. Among the materials conventionally used to form such partitions are blast furnace slag or volcanic ash bound into self-sustaining slabs with a relatively small amount of Portland cement. These slabs are then suitably associated to define the partitions above mentioned; and the function of such partitions, of course, is to absorb or deaden the noise created by operation of the engines.

The air streams so induced by propeller-driving engines attain velocities on the order of fifty to sixty miles per hour; and the arrangements of the prior art have been quite effective in the accomplishment of their intended functions over relatively long periods of relatively continuous use.

With the advent of jet engines, however, it has been found that the constructions of the prior art are no longer satisfactory. The failure of such constructions is believed to be due to the tremendous increase in the velocities of the air streams induced by the operation of jet engines as compared to those induced by propeller-driving engines. Those velocities are currently from two hundred to four hundred miles per hour as compared with fifty to sixty miles per hour. While the materials used for absorbing sound in such test stands are, as I have stated above, self-sustaining, they must be highly porous and cannot be too intimately or solidly bound, else the sound-absorbent capacity of the finished partitions will be decreased below an acceptable level; and consequently the inherent cohesive strength of such partitions is relatively low. Consequently, an air stream, under the velocities current when jet engines are tested, will rather rapidly disintegrate the partitions of the prior art, actually tearing relatively large pieces from the partition surfaces swept by the stream and entraining such pieces in the flowing air stream. When such pieces are detached from the partitions in the eduction or exhaust passage, the only objectionable consequences are the rapid destruction of the usefulness of the partitions and the relatively unimportant contamination of the outer atmosphere; but when such pieces are torn from the partitions in the induction passage, they are frequently carried, by the rushing air stream, into the interiors of the engines, where they do serious, and sometimes irreparable, damage.

Sheathing of the surfaces of such partitions with sheet metal or woven wire screen has been proposed; but it has been found that flat, perforated, or even reticulate, sheets, when subjected to air flow at the velocities and under the conditions obtaining in jet engine test stands, are caused to flutter or vibrate at such a frequency and with such intensity that fatigue and failure occur in a relatively short time. Corrugated sheathing has been found unsatisfactory both because it does not wholly eliminate vibration and fatigue and because it has been found that the sheathing must snugly engage the whole surface of the sound-absorbent mass, and it is impractical to try to produce sound-absorbent panels with corrugated surfaces to fit the corrugated sheathing.

It is the primary object of the present invention to produce an improved test stand in which the objectionable noise of operation of jet engines will be effectively absorbed or deadened, but in which the defects of known structures, as above outlined, will be overcome.

A further object of my invention is to produce a sound absorbing or deadening chamber of novel construction through which air or other gases may be passed at extremely high velocities without any substantial attrition or disintegration of the sound absorbent masses used in the chamber.

A still further object of the invention is to provide a novel sound absorbent unit for use in such a chamber.

Another object of the invention is to provide a sound absorbent unit made up of a plurality of independent elements, arranged in a coaxial series within a single unit, but separately replaceable in case of damage or loss of efficiency to any such element from any cause.

Still further objects of the invention will appear as the description proceeds.

To the accomplishment of the above and related objects, my invention may be embodied in the forms illustrated in the accompanying drawings, attention being called to the fact, however, that the drawings are illustrative only, and that change may be made in the specific constructions illustrated and described, so long as the scope of the appended claims is not violated.

Fig. 1 is a longitudinal section, more or less diagrammatic, through a test stand constructed in accordance with my invention;

Fig. 2 is a transverse section, taken substantially on the line 2—2 of Fig. 1;

Fig. 3 is an enlarged, fragmental section taken substantially on the plane of Fig. 1;

Fig. 4 is an enlarged, longitudinal section through a fragment of one form of a single sound absorbent unit of my invention;

Fig. 5 is a fragmental perspective view of one simple form of sound absorbent element which may be used in the practice of my invention, in place in an external sheath, parts of which have been broken away for clarity of illustration;

Fig. 6 is an exploded perspective view of a preferred form of sound absorbent element which may be used in the practice of my invention;

Fig. 7 is an enlarged transverse section through an element of the character illustrated in Fig. 6;

Figures 8, 9:
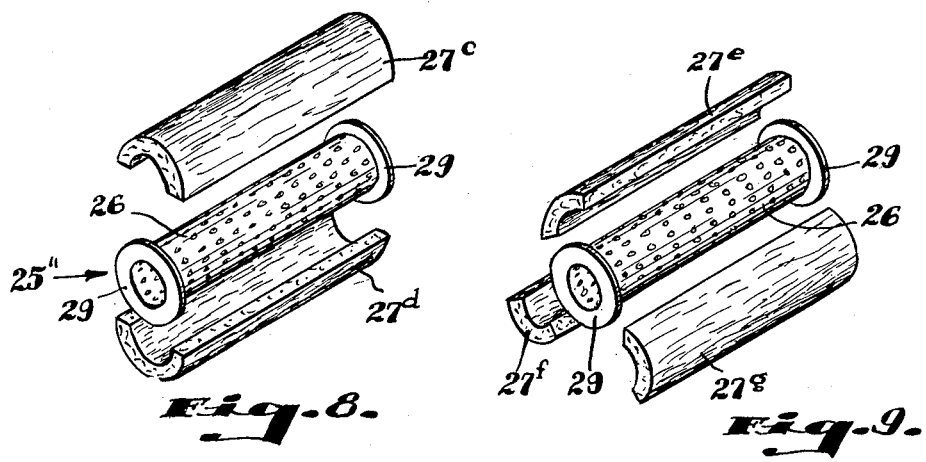
Fig. 8 is a view similar to Fig. 6 but showing a modified form of element.
Fig. 9 is a similar view of still another form.

Referring more particularly to the drawings, it will be seen that I have illustrated a test stand comprising, in accordance with conventional practice, a chamber 11 in which may be mounted a jet engine, conventionally indicated at 12, so positioned as to induce, when in operation, a stream of air flowing generally horizontally through the chamber 11 from right to left as seen in the drawings. An air induction or inlet passage, indicated generally by the reference numeral 13, may comprise a vertical section 14 and a horizontal section 15 merging with the right-hand end of chamber 11; and an air eduction or outlet passage, indicated generally by the reference numeral 16, may comprise a vertical section 17 and a horizontal section 18 merging with the left-hand end of the chamber 11. Either or both of the vertical sections 14 and 17 of the passages 13 and 16 may be, and in some installations will preferably be, omitted from the installation.

Sound absorbing or deadening means is installed in one or both of the passage sections 15 and 18. The sound absorbing means used in the respective passages may be identical and will be substantially so, and therefore it will be understood that, in the following initial description of such means, either the inlet passage or the outlet passage may be under discussion. Subsequently, details in which the two installations may differ, will be pointed out.

Figure 10:
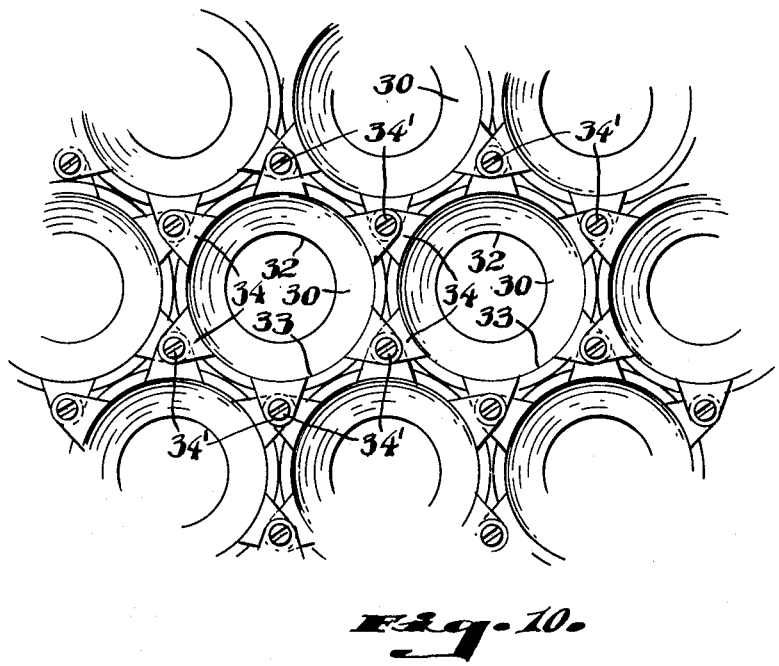
Fig. 10 is an enlarged view illustrating the structural details of a special ferrule which I prefer to mount preferably at each end, but certainly at the down-stream end, of each sound absorbent unit used in the practice of my invention, and illustrating, further, the manner in which ferrules of contiguous conduits may be joined to integrate the entire bundle of sound absorbent units in a passage.

Transversely-extending rails or stools 19 will be installed on the floor of the passage section 15 or 18 at each end thereof; and these supports may be continuous or interrupted, as desired. A layer of sound absorbing units 20 will be put down to span the two rails, being supported thereon somewhat above the level of the floor 21. This is for the reason that moisture will inevitably condense within the passage sections, and it is desirable that such moisture may flow freely to, and be discharged through, a series of drains 22 opening through said floor and leading to a waste header 23. As is clearly shown in Fig. 2, the units 20 of the bottom layer will be disposed in mutual lateral contact and will extend from side to side of the passage section 15. The next layer of such units will be staggered with respect to the bottom layer, and will likewise be in mutual lateral contact; while the units of the third layer will be in vertical alignment with—that is, will have their axes disposed in common vertical planes with the axes of—the units of the bottom layer. Successive layers of units 20 will be stacked into the passage section in corresponding arrangement until such section is substantially filled with the bundle of such units, in the manner shown in Fig. 2. Preferably, but not necessarily, the several units will be anchored against relative movement, as in the manner illustrated in Fig. 10, and to be explained hereinafter.

Each unit 20 comprises an outer sheath 24 and a series of sound absorbing elements indicated generally by the reference numeral 25, as illustrated in Fig. 4. Each sheath 24 is an integral, foraminous tube of annular cross-section and formed preferably from sheet material. At any rate, the material of the sheath 24 must be characterized by an inherent cohesive strength sufficient to resist successfully any substantial attrition or disintegration under the influence of air flow sweeping its surface at velocities in excess of one hundred miles per hour and ranging to four hundred or more miles per hour. I presently believe that galvanized iron sheet, steel sheet of conventional proportions, stainless steel sheet and aluminum or conventional alloys thereof are optimum materials for such use, and that many other materials, including some of the synthetic plastics may be acceptable.

Each sound absorbing unit 25 comprises a hollow, foraminous inner sheath or core 26, which may be made of any of the materials acceptable for the sheath 24, with a cover or sleeve or sound absorbent material, indicated generally by the numeral 27, carried thereon. Materials appropriate for the sleeve 27 include, but are not necessarily limited to, expanded slag, pumice aggregate, cinder aggregate, volcanic ash, rock wool, steel wool, sponge rubber, either in sheet form or in ground condition, "Zonolite," granulated cork and "Fiberglas." Granulated ground or powdered materials should be held together by a suitable binder such as, for instance, Portland cement, asphaltum, bitumen or any suitable adhesive, or pressed to a self-sustaining condition. Fibrous materials should be matted or felted to a reasonable degree of inherent cohesiveness.

In Fig. 5, for instance, I have shown the core 26 wrapped with a strip or pad 27 of felted or matted material such as mineral wool, steel wool, "Fiberglas" or the like, the strip or pad being preferably secured in place by a wire 28 spirally wound about the outer surface of the strip. As shown, I prefer to form the core 26 to provide a radially-outwardly-projecting flange means 29 at each end thereof to perform a dual purpose. In the drawings, I have shown the flange means 29 as peripherally continuous, but it will be clear that, even if the flange means were interrupted, it would still act to restrain the sound absorbent sleeve 27 against axial movement relative to the core 26. I prefer to make the radial projection of the flange means substantially equal to the radial thickness of the sleeve 27, and to arrange both so that the outside diameter of the sleeve 27 and of the flange means 29 is substantially equal to the inside diameter of the sheath 24, whereby, when the element 25 is telescopically entered in the sheath 24, the flange means and the external surface of the sleeve 27 will snugly engage and be supported in the internal surface of the sheath 24.

Preferably, each sheath 24 will integrally extend from end to end of the passage section 15 or 18; but each element 25 is substantially shorter than the sheath 24 so that a series of elements 25 may be received in each sheath 24 in longitudinal succession, as clearly shown in Fig. 4, successive elements being in end-to-end abutment.

I prefer to mount, at each end of each conduit 20, a ferrule 30, anchoring the series of elements 25 against axial movement within the sheath. The inner surface 31 of each such ferrule flares, as shown, from its inner end 32 (Fig. 10), abutted by the adjacent element 25, to its outer end 33. At its inner end, the diameter of the surface 31 is substantially equal to the inside diameter of the core 26, and at its outer end the diameter of said surface is substantially equal to the inside diameter of the sheath 24. Preferably, but not necessarily, each ferrule will be provided with a group of radially-projecting ears 34, respectively overlapping and secured, as by fastening means 34', to the corresponding ears of the ferrules of the contiguous conduits 20 to integrate the entire bundle of conduits in any passage section.

In Figs. 6 and 7, I have shown what I presently consider to be an optimum form of element 25' for use in the inlet passage 15. In this form, the sleeve 27 comprises two mating, semi-cylindrical sections 27a and 27b, each snugly clothed in a wrapper 35a or 35b of fine-mesh reticulate material. I presently prefer to use copper or aluminum wire screen for the wrappers 35a and 35b; but synthetic strands of various types might be used to good effect in making the reticulate wrappers. The two wrapped, semi-cylindrical sections will be assembled with a core 26 in the manner clearly suggested in Figs. 6 and 7 and, when the assembly is subsequently entered in a sheath 24, the parts will be effectively retained in assembled relation.

If a similar assembly is to be used in the outlet passage 18, a heavier screen, of material resistant to high temperature, must be used in place of the fine-wire or synthetic mesh illustrated in Figs. 6 and 7, because of the highly elevated temperatures under which gases are discharged from the engine 12.

In Fig. 8, I have shown still another form of sound absorbent element 25", similar to the form of Fig. 6 in that the sleeve 27 is made up of two mating, semi-cylindrical, self-sustaining, molded blocks of sound absorbent, porous material; but in this instance, the blocks 27c and 27d are devoid of wrappers such as those illustrated in Figs. 6 and 7. More inherent cohesive strength must be given to the blocks 27c and 27d; and in many instances that fact may reduce the sound-absorption capacity of the sleeve, for which reason I presently prefer the form of sleeve illustrated in Figs. 6 and 7.

In Fig. 9, I have shown still another form of sleeve 27 comprising three mating, part-cylindrical sections 27e, 27f and 27g adapted to be assembled to surround the core 26. While no wrappers have been shown in Fig. 9, it will be clear that the three sections there shown might be clothed in a manner analogous to that disclosed in the discussion of Figs. 6 and 7.

The use of the several, independent elements 25 is obviously accompanied by maintenance advantages. Oil and/or other condensable substances may be discharged from the engine 12 and may be entrapped in the sound absorbent material in the units 20 installed in the outlet passage section 18; and foreign matter of various kinds inducted from the outside atmosphere may similarly be entrapped in the units 20 installed in the inlet passage section 15. Such entrapment may so clog the pores of the sleeves of certain of the elements 25 as to interfere with the sound absorbent capacity thereof, while other elements in the same units 20 may be substantially unaffected. In such a case, of course, only the affected elements need be replaced to restore the system to optimum efficiency.

Because of the annular shape of each of the sheaths 24 and 26, through which maximum rigidity is attained therein, flutter and vibration of said sheaths is eliminated or reduced to such a degree as to be negligible, whereby the sound absorbent sleeves are protected and sustained against substantial attrition or disintegration, while the early mortality of previously-known devices designed for accomplishing a comparable protection, is avoided.

I claim as my invention:

1. In a test stand primarily for testing jet engines, a chamber for mounting an engine or the like, an induction passage, and an eduction passage for said chamber, and sound deadening means in one of said passages comprising a bundle of tubular conduits of annular cross-section substantially filling said passage, each conduit comprising an annular mass of sound absorbent material and external and internal sheathing means for each such mass, each sheathing means being a foraminous sheet of material having a cohesive strength greatly exceeding that of such sound absorbent material, and each external sheathing means providing a longitudinally-extending, open-ended passage therethrough, each such conduit comprising an external sheath of annular cross-section and extending substantially from end to end of said passage, and a series of independent internal sheaths of annular cross-section telescopically received in abutting longitudinal succession within said external sheath, each such internal sheath carrying a separate annular portion of said mass of sound absorbent material externally sleeved thereon.

2. The invention of claim 1 in which each such internal sheath is provided, at its opposite ends, with radially-outwardly-extending flange means adapted snugly to engage the internal surface of said external sheath and acting to confine the associated portion of sound absorbent material against axial movement relative to said internal sheath.

3. The invention of claim 1 in which each such separate portion of sound absorbent material comprises two mating semi-cylindrical sections, each such semi-cylindrical section being snugly clothed in a reticulate wrapper.

4. In a test stand primarily for testing jet engines, a chamber for mounting an engine or the like, an induction passage, and an eduction passage for said chamber, and sound deadening means in one of said passages comprising a bundle of tubular, open-ended conduits of annular cross-section substantially filling said passage, each conduit comprising an external sheath of annular cross-section and extending substantially from end to end of said passage, and a series of independent internal sheaths of annular cross-section telescopically received in longitudinal succession within said external sheath, each such internal sheath carrying a separate annular portion of sound absorbent material externally sleeved thereon, and a layer of wire screen interposed between each such annular portion and its internal sheath and between each such annular portion and said external sheath, each such sheath being a foraminous sheet of material having a cohesive strength greatly exceeding that of such sound-absorbent material.

5. As an article of manufacture, for use in a sound-deadening system, for passing gases at velocities in excess of one hundred miles per hour, a conduit comprising an external foraminous metal pipe of circular cross-section and a series of elements snugly received in said pipe in longitudinal contiguous succession, each such element comprising a foraminous, hollow metal core of circular cross section and an annular mass of sound-absorbent material sleeved on said core, the external diameter of said annular mass being substantially equal to the internal diameter of said pipe.

6. The article of claim 5 in which each core is provided, at least at one end, with radially-outwardly-extending flange means constructed and arranged to engage the internal surface of said pipe and effective to restrain relative axial movement between said core and the mass of sound absorbent material.

7. The article of claim 5 in which each such annular mass of sound absorbent material comprises two mating semi-cylindrical sections, each such section being snugly clothed in a reticulate wrapper.

8. As an article of manufacture for use in a sound deadening system for passing gases at velocities in excess of one hundred miles per hour, such system including a foraminous annular sheath, a hollow core consisting of an integral sheet of material having an inherent cohesive strength sufficient to resist any substantial disintegration under the influence of such passing gases, said core being substantially cylindrical, and an annular mass of porous, sound absorbent material of relatively low cohesive strength sleeved on said core, said core and said mass of sound absorbent material being constructed and arranged for snug reception in such a sheath, said core being formed to provide radially-outwardly-extending flange means at each end thereof restraining said mass of sound absorbent material against axial movement relative to said core.

9. The article of claim 8 in which the radial extent of each such flange means is substantially equal to the radial thickness of said mass of sound absorbent material.

10. As an article of manufacture for use in a sound-deadening system for passing gases at velocities in excess of one hundred miles per hour, such system including a foraminous annular sheath, a hollow core consisting of an integral sheet of material having an inherent cohesive strength sufficient to resist any substantial disintegration under the influence of such passing gases, said core being substantially cylindrical, and an annular mass of porous, sound absorbent material of relatively low cohesive strength sleeved on said core, said mass of sound absorbent material comprising a plurality of mating, self-sustaining part-cylindrical sections, each such section being snugly clothed in a reticulate wrapper.

11. In a test stand primarily for testing jet engines, a chamber for mounting an engine or the like in position to induce a stream of air through said chamber, an induction passage and an eduction passage for said chamber, and sound deadening means in one of said passages comprising a bundle of tubular conduits susbtantially filling said passage and having their axes arranged in mutual parallelism for passage of said air stream therethrough, each conduit comprising an external foraminous sheath of annular cross-section, a series of substantially identical, independent, hollow inner foraminous sheaths of annular cross-section telescopically received in said external sheath in longitudinal succession, and an annular mass of sound absorbent material sleeved on each inner sheath and sustained between said inner sheath and said external sheath, and an annular ferrule at that end of each conduit from which said air stream emerges, the inner surface of said ferrule flaring, in the direction of air stream movement, from a diameter substantially equal to the internal diameter of an inner sheath at the inner end of said ferrule, to a diameter substantially equal to the internal diameter of said external sheath at the outer end of said ferrule.

References Cited in the file of this patent

UNITED STATES PATENTS

| | | |
|---|---|---|
| 291,762 | Nason | Jan. 8, 1884 |
| 1,127,250 | Humm | Feb. 2, 1915 |
| 2,065,343 | More et al. | Dec. 22, 1936 |
| 2,089,492 | Lambert | Aug. 10, 1937 |
| 2,270,825 | Parkinson et al. | Jan. 20, 1942 |
| 2,514,996 | Faust | July 11, 1950 |
| 2,519,162 | Tucker | Aug. 15, 1950 |
| 2,583,366 | Engels | Jan. 22, 1952 |
| 2,674,335 | Lemmerman | Apr. 6, 1954 |
| 2,685,936 | Brenneman et al. | Aug. 10, 1954 |

FOREIGN PATENTS

| | | |
|---|---|---|
| 156,689 | Switzerland | Nov. 1, 1932 |
| 406,442 | Great Britain | Mar. 1, 1934 |
| 86,579 | Sweden | June 16, 1936 |
| 853,854 | France | Mar. 30, 1940 |